United States Patent
Brooke et al.

(10) Patent No.: US 7,565,765 B2
(45) Date of Patent: Jul. 28, 2009

(54) PNEUMATIC LIQUID DISPENSING ASSEMBLY FOR HYDROPONICALLY CULTIVATED PLANTS

(75) Inventors: Lawrence L. Brooke, Sebastopol, CA (US); Brent A. Goetzl, Orinda, CA (US); Keith C. Evans, Forestville, CA (US); Henry Rie, Richmond, CA (US)

(73) Assignee: Lawrence Brooke Engineering, LLC, Grafton, CA (US)

( * ) Notice: Subject to any disclaimer, the term of this patent is extended or adjusted under 35 U.S.C. 154(b) by 617 days.

(21) Appl. No.: 11/141,799

(22) Filed: May 31, 2005

(65) Prior Publication Data

US 2005/0274824 A1    Dec. 15, 2005

Related U.S. Application Data

(60) Provisional application No. 60/575,646, filed on May 28, 2004.

(51) Int. Cl.
*A01G 31/00* (2006.01)
*A01G 29/00* (2006.01)
*A01G 25/00* (2006.01)
*F04F 1/06* (2006.01)
*F04F 3/00* (2006.01)

(52) U.S. Cl. .............. 47/62 R; 47/48.5; 47/79; 417/118

(58) Field of Classification Search ......... 47/62 R, 47/48.5, 79, 60, 82, 67, 39; 239/12, 23, 340, 239/344, 346; 222/394, 399; 417/118
See application file for complete search history.

(56) References Cited

U.S. PATENT DOCUMENTS

| | | | |
|---|---|---|---|
| 2,306,027 A * | 12/1942 | Swaney | 47/79 |
| 2,764,845 A | 10/1956 | Colombini | |
| D239,129 S | 3/1976 | Rosenberger | |
| D244,471 S | 5/1977 | Cicci | |
| 4,513,533 A | 4/1985 | Gething et al. | |
| 4,788,792 A | 12/1988 | Womick | |
| 5,440,836 A | 8/1995 | Lee | |
| 5,502,923 A | 4/1996 | Bradshaw | |
| 5,896,701 A | 4/1999 | Schaerer | |
| 6,843,022 B1 * | 1/2005 | Holley | 47/67 |
| 2002/0005011 A1 | 1/2002 | Goldberg et al. | |

* cited by examiner

*Primary Examiner*—Michael R Mansen
*Assistant Examiner*—Monica L Williams
(74) *Attorney, Agent, or Firm*—Michael Blaine Brooks, P.C.; Michael B. Brooks

(57) ABSTRACT

Disclosed is a pneumatic liquid nutrient dispensing assembly for hydroponically cultivated plants. The assembly includes a reservoir and a liquid nutrient dispenser disposed within the reservoir. The liquid nutrient dispenser includes a substantially coaxial pump body with inner and outer tubes forming a distribution end having a distribution hub and an inlet end having a liquid intake structure. Airflow in an annular duct formed between the walls of the coaxial tubes enters the inner tube through an annular passage and carries liquid nutrient within the inner tube to the distribution hub. Distribution members fluidly connected to the distribution hub direct a flow of liquid nutrients and air to one or more plants.

2 Claims, 9 Drawing Sheets

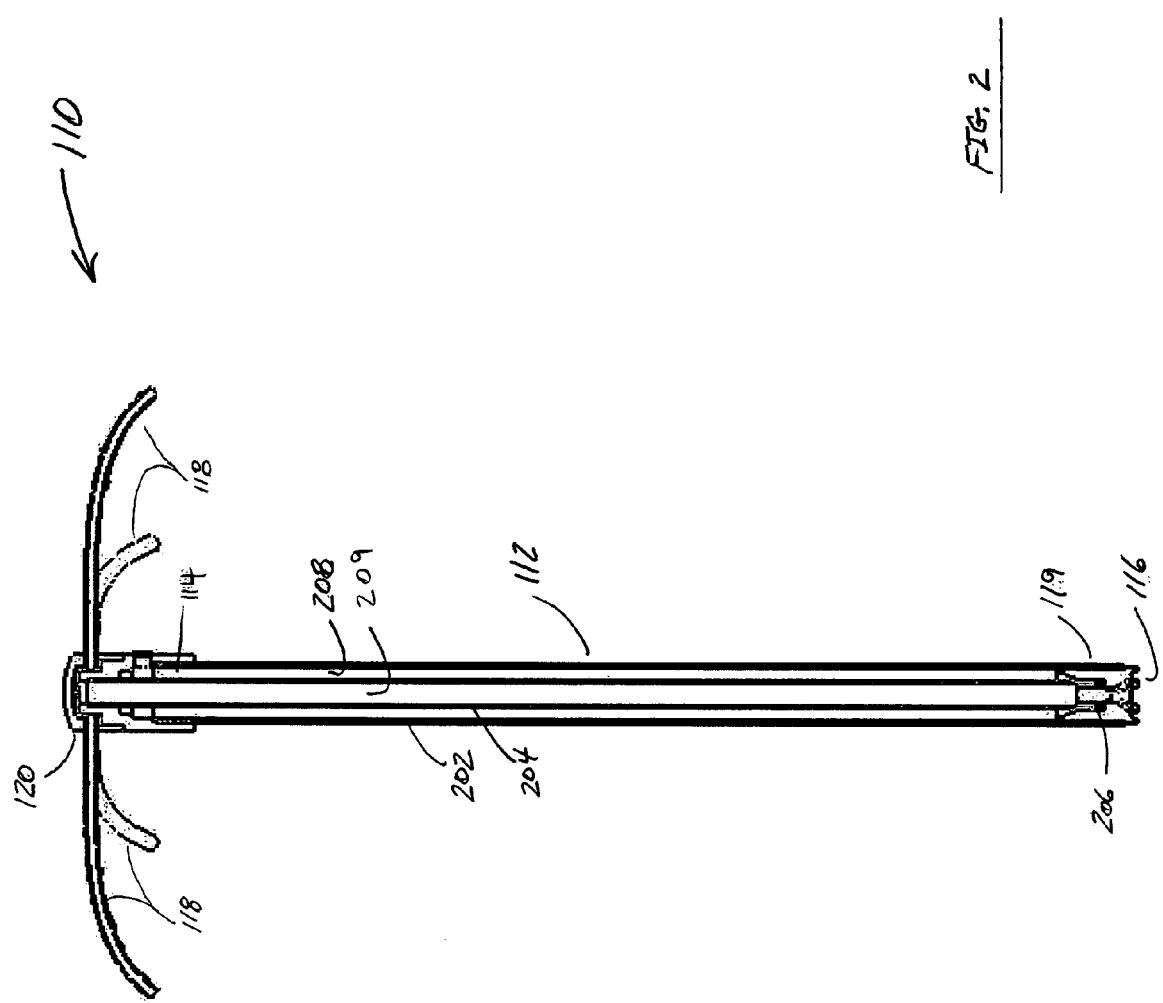

PNEUMATIC LIQUID DISPENSING ASSEMBLY FOR HYDROPONICALLY CULTIVATED PLANTS

CROSS REFERENCE TO RELATED APPLICATIONS

The present application claims the benefit of provisional application U.S. 60/575,646 which was filed May 28, 2004 and entitled PNEUMATIC LIQUID NUTRIENT DISPENSING ASSEMBLY FOR HYDROPONICALLY CULTIVATED PLANTS.

BACKGROUND OF THE INVENTION

1. Field of the Invention

The present invention pertains to the mechanical arts. More particularly, the present invention pertains to a liquid dispensing assembly for hydroponically cultivated plants.

2. Description of Related Art

Hydroponic cultivation is a well known method of sprouting and growing plants, vegetables, flowering plants, trees and novelty plants, such as Venus-Fly-Traps, among others, in a soil-less environment. But, water and nutrients normally available in natural soils must be supplied to the hydroponic environment.

Water and nutrients can be supplied to hydroponically cultivated plants by various means. One popular method utilizes a drip hose connected to a pressurized water source. Actuating a manual or automatic valve interconnecting the drip hose and the pressurized water supply starts and stops the irrigation process.

Such a system has several drawbacks. One drawback is that there must be a source of pressurized water to operate the drip hose. Absent such a source, this design cannot be used.

Another drawback is the lack of uniform distribution of liquid nutrient to each plant. Pressure changes in a relatively long, high pressure drip hose result in varying rates of distribution as compared to a more uniform distribution that is characteristic of a low pressure system and in particular a low pressure system having a plurality of distribution members.

Another drawback concerns the delivery of a water-nutrient mixture. Since the water source is pressurized, nutrients that will be mixed with the water must be introduced under pressure into the pressurized water stream. The requirement for a pressurized nutrient source and mixer to obtain the proper proportions of water and nutrients increases the cost of the system.

Yet another drawback is the requirement for a high pressure valve. In particular, an automated system will require a solenoid type or similar control valve. Such valves increase the cost of the system and increase the likelihood of failure.

Each of these drawbacks also increases the number of components in the system and thus its complexity. Moreover, the system reliability is reduced since increasing the number of components also increases the number of failure points and therefore the potential for failure to occur.

Accordingly, there has existed a definite need for a liquid nutrient dispensing assembly providing for dispensing of water and nutrients despite the absence of a high pressure water source. There has existed a further need for a dispensing assembly providing for more precise mixing of water and nutrients. There has existed a still further need for a simplified liquid nutrient dispensing assembly providing for the reliable and uniform distribution of water and nutrients. The present invention satisfies these and other needs, and provides further related advantages.

SUMMARY OF THE INVENTION

Now in accordance with the invention, there has been found an assembly for automatically dispensing water mixed with nutrients that eliminates the need for a high pressure water source, while reducing the number of components and increasing dispensing reliability.

In an embodiment the assembly comprises a hollow intake structure having a liquid exit end and a liquid entry end immersed in liquid nutrient. A first tube has an inlet end and an outlet end wherein the inlet end surrounds a portion of the liquid exit end to form a first annular passage therebetween. A gas chamber receives a gas from a gas source and the gas chamber supplies gas to the first annular passage. A gas and liquid chamber formed within a distribution hub receives gas and liquid from the outlet end of the first tube. The distribution hub has a first opening in fluid communication with the gas and liquid chamber and a first seal between the first opening and the outlet end of the first tube. Gas and liquid are thereby supplied by the gas and liquid chamber to one or more distribution members.

In another embodiment the assembly comprises a reservoir containing liquid nutrient and having a liquid level below a planting space. A means within the reservoir supports one or more plants above the liquid level. A pneumatically operated liquid dispensing assembly is disposed within the reservoir. The dispensing assembly comprises a liquid intake structure shaped like an inverted funnel, a tubular discharge end of the funnel inserted into a substantially vertically oriented tube, a converging inlet end of the funnel immersed in the liquid nutrient, an annular passage between the funnel tube and the vertical tube, an air supply in fluid communication with the annular passage, and carriage of liquid nutrient to a distribution hub at the upper end of the vertical tube in response to air entering the vertical tube via the annular passage.

BRIEF DESCRIPTION OF THE DRAWINGS

The novel features of this invention will be best understood from the accompanying drawings, taken in conjunction with the accompanying description, in which similar characters refer to similar parts, and in which:

FIG. 1b is a perspective view of the reservoir and the pneumatic liquid dispenser of FIG. 1a.

FIG. 2 is a cross-sectional view of the liquid nutrient dispenser of FIG. 1a.

FIG. 3 is a cross-sectional view of a distribution hub of the liquid nutrient dispenser of FIG. 1a.

FIG. 4a is a cross-sectional view of the inlet structure of the liquid nutrient dispenser of FIG. 1a.

FIG. 4b is a cross sectional view of an inverted funnel insert of the liquid nutrient dispenser of FIG. 1a.

FIG. 5b is a perspective view of the reservoir and the pneumatic liquid dispenser of FIG. 5a.

DESCRIPTION OF THE PREFERRED EMBODIMENTS

Figure 1A:
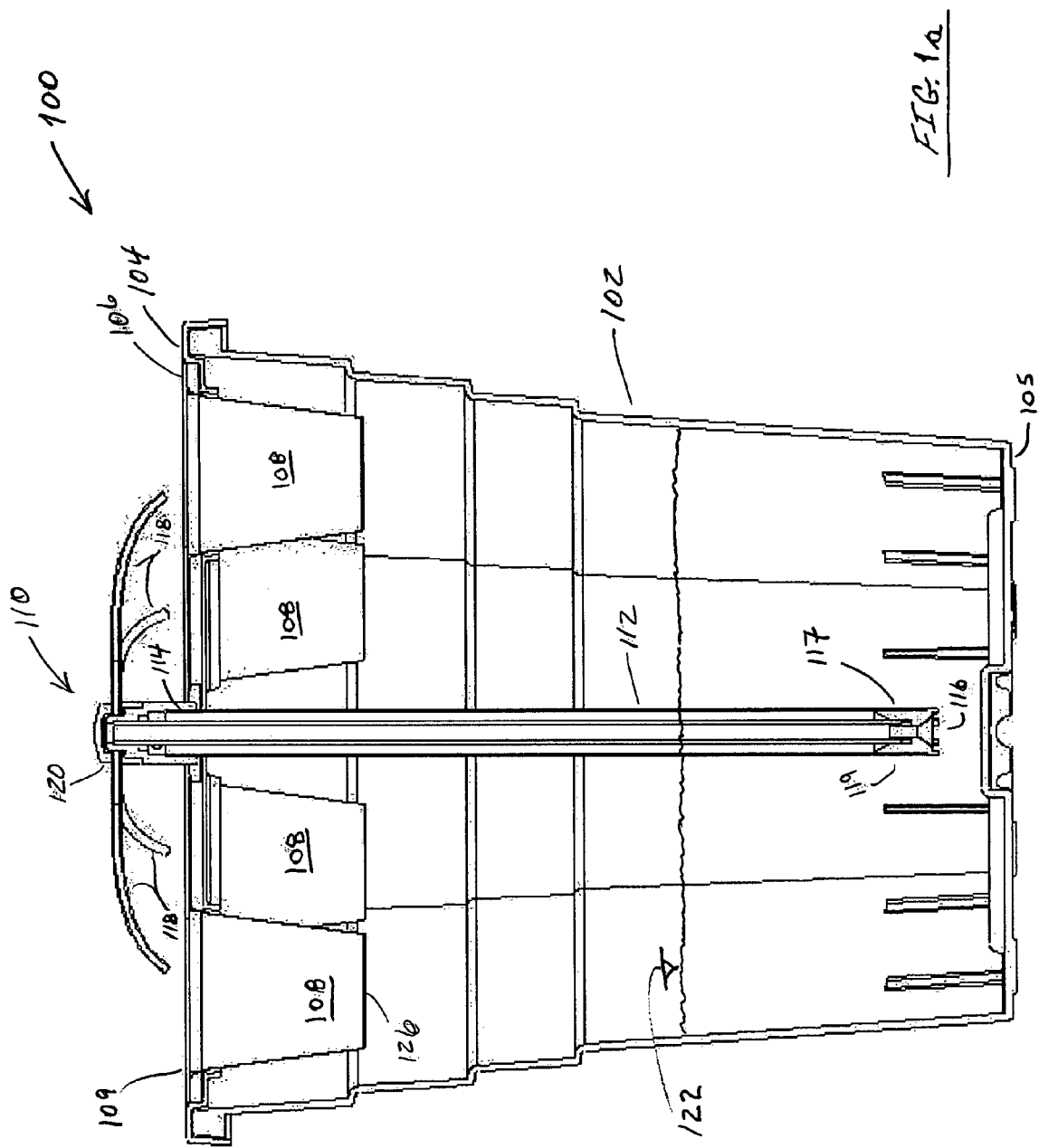
FIG. 1a is a cross-sectional view of a first exemplary embodiment of a reservoir and a pneumatic liquid nutrient dispenser of the present invention.
Figure 1B:
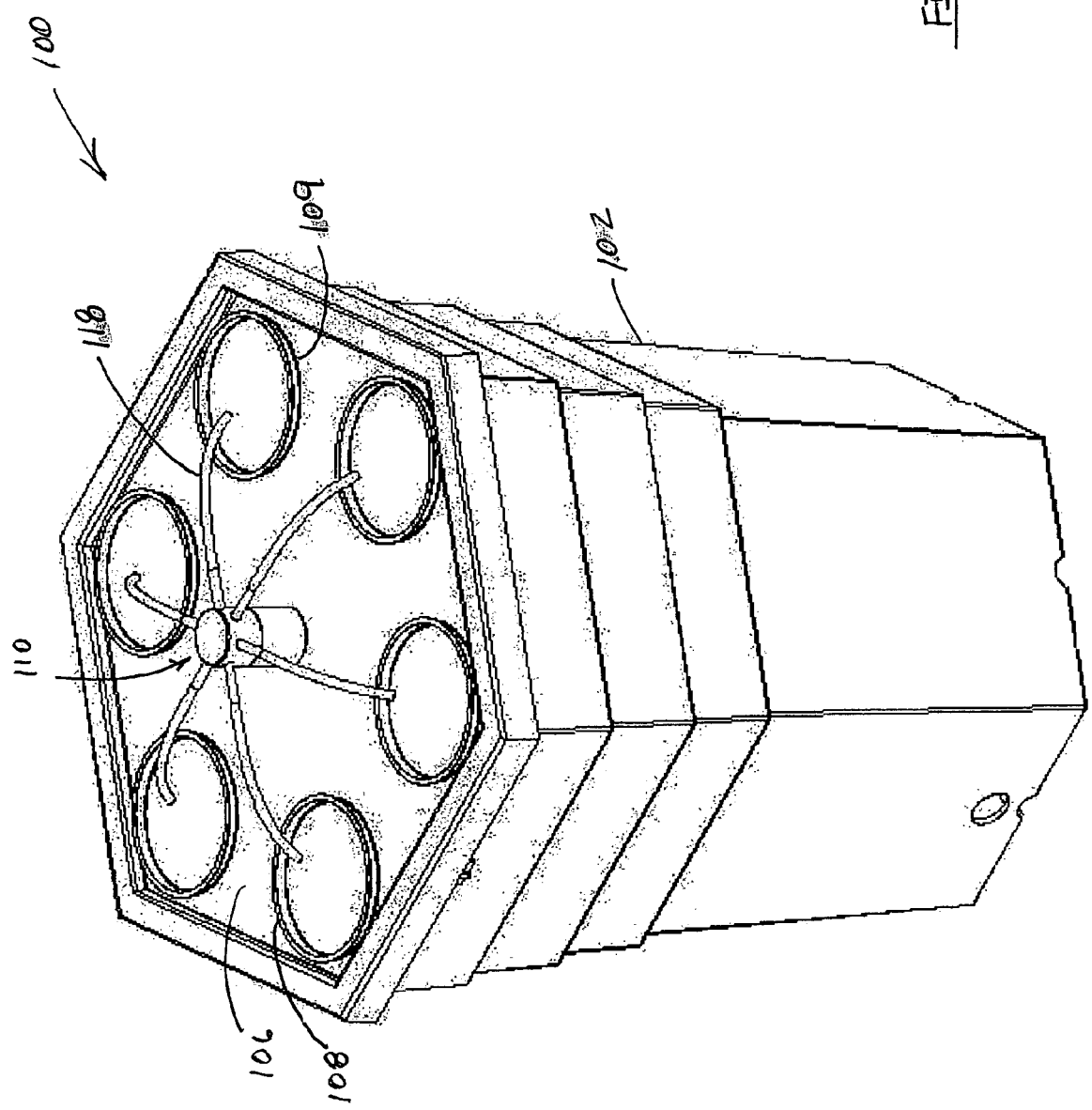

FIGS. 1*a* and 1*b* show a hydroponic cultivator 100. The cultivator includes a reservoir 102 and a pneumatic liquid nutrient dispensing assembly 110. The reservoir has an open upper end 104, a closed lower end 105, a tray 106 supported by the upper end of the reservoir, and planting pots 108 inserted in holes 109 in the tray. The pneumatic liquid nutrient dispensing assembly is centrally mounted in the reservoir and supported by the tray. As used herein, the reference to liquid nutrient includes water or a mixture of water and plant nutrients.

The pneumatic liquid nutrient dispensing assembly 110 includes a pump body 112 having a distribution end 114 and an intake end 116 having an intake structure 119. A plurality of dispensing members 118 extend radially outward from a distribution hub 120 that is mounted on the distribution end of the pump body to provide liquid nutrients to respective planting pots 108.

Suitable distributing members 118 include tubes, open channels, strings, and rods or like structures for directing the flow of nutrients to a given plant. For example, the dispensing members can be made of polyvinyl chloride ("PVC") tubing cut to individual lengths. Each dispensing member can be positioned independently of the remaining dispensing members. Therefore, it is a distinct advantage of the invention that in a particular application, the distribution members can be configured to provide liquid nutrients to one or more plants.

In an embodiment, the distribution members 118 are conformable. And in some embodiments, the distribution members are polymeric tubes having an attached or embedded plastically deformable element such that a distribution member that is conformed to water a specific plant for example substantially retains the conformed shape. The plastically deformable element is preferably made of a metal and most preferably of a mild steel.

Referring additionally to FIG. 2, there is shown the pneumatic liquid nutrient dispensing assembly 110 removed from the reservoir 102. The dispensing assembly includes a pump body 112, a distribution hub 120, and a liquid intake structure 119. The pump body is seen to include an outer tube 202 and an inner tube 204 forming a substantially annular air duct 208 around a central channel 209. The outer tube extends from the distribution hub to the intake end 116 of the pump body. The inner tube extends from the distribution hub to a location 206 between intake end 116 and the distribution end 114 of the pump body. In an embodiment, the inner and outer tubes are oriented in a substantially coaxial relationship. The tubes can be made out of any suitable material. Preferred materials include polyvinyl chloride ("PVC"). It is an advantage of the inventive assembly that the outer tube can be made of standard PVC pipe, while the inner coaxial tube can be made of PVC hose.

As best seen in FIG. 1, the length of the pump body 112 generally depends on the depth of the reservoir and the liquid level 122 within the reservoir. The length of the outer and inner tubes 202, 204, as well as their respective diameters and wall thicknesses will be readily determinable by the skilled artisan without undue experimentation. In an embodiment, the outer tube 202 has an outer diameter 340 of about 0.85 inches and an inner diameter 342 of about 0.77 inches and the inner tube 204 has an outer diameter 346 of about 0.43 inches and an inner diameter 344 of about 0.36 inches (see FIG. 3).

Figure 3:
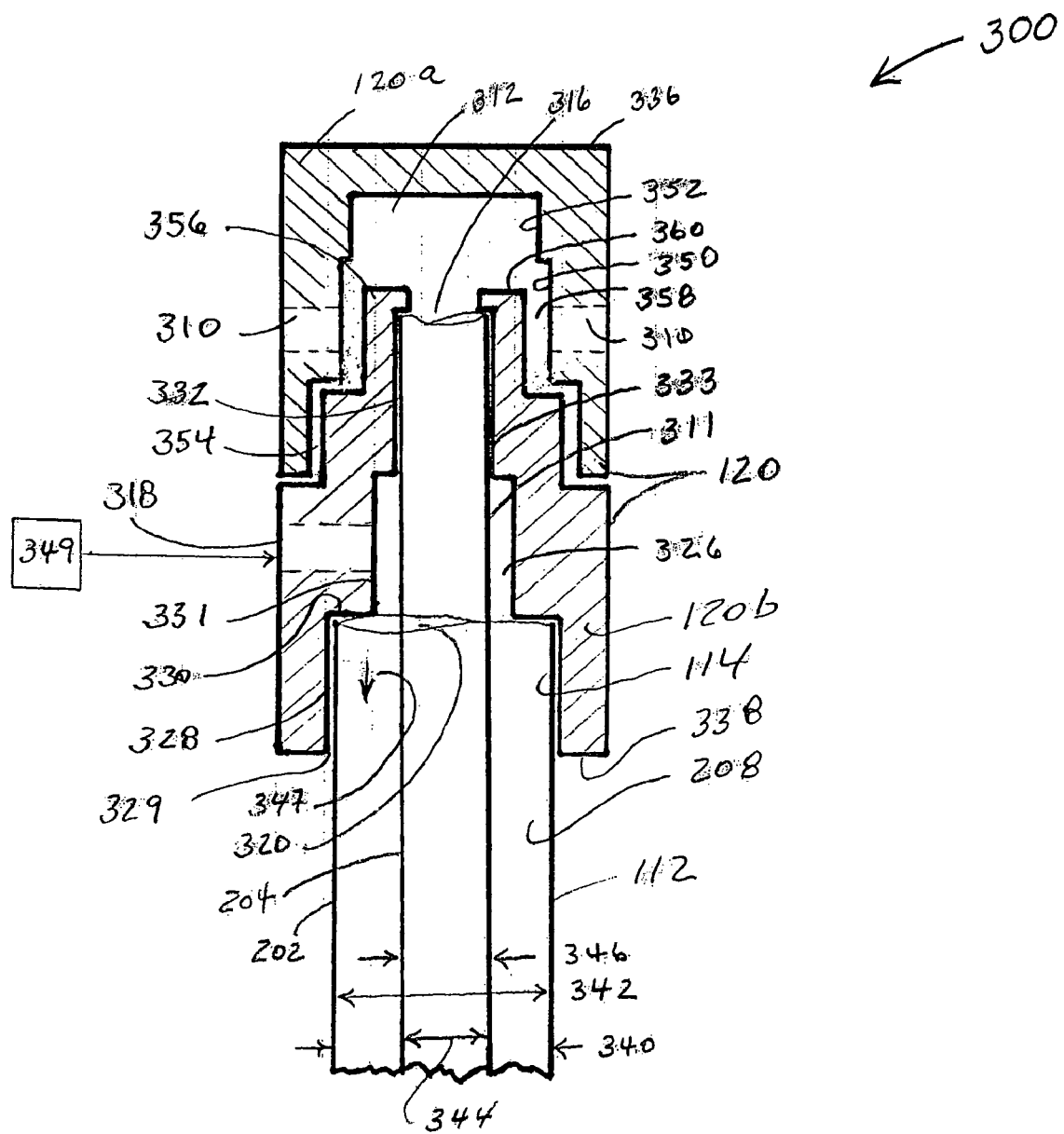

FIG. 3 shows an enlarged view of the distribution end 114 of the pump body and the distribution hub 300. The distribution hub 120 has a closed end 336 and an open end 338. The interior surface of the distribution hub defines a multiple step chamber. Beginning with the open end, a first step 328 has a circular cross-section with a diameter corresponding to the outer diameter of the outer tube 340; a second step 331 has a circular cross-section with a diameter intermediate between the inner diameter of the outer tube 342 and the outer diameter of the inner tube 346; a third step 332 has a circular cross-section with a diameter corresponding to the outer diameter of the inner tube. The distribution hub can be made of any suitable material. Representative materials include thermoplastic resins such as PVC, acryonitrile-butadiene-styrene, or polycarbonate resins.

The outer tube 202 is positioned so that its upper end 320 abuts a shoulder 330 of the first step 328. A first fluid-tight seal 329 is formed between the outer diameter of the outer tube 340 and the portion of the interior surface of the distribution hub defining the sides of the first step. The first fluid-tight seal is formed using any suitable method. In a preferred embodiment, there is an interference fit between the outside diameter of the outer tube and the interior surface of the distribution cap defining the sides of the first step.

An air chamber having an annular cross-section 326 is formed between the portion of the interior surface of the distribution hub defining the sides of the second step and the outer diameter of the inner tube 346. An air port 318 in the distribution hub is in fluid communication with the air chamber and a source of pressurized air 349 is interconnected with the air port. References herein to air include air or another gas such as carbon dioxide or nitrogen.

An upper portion of the inner tube 311 passes through the first air chamber 326 and a second fluid-tight seal 333 similar to that mentioned above is formed between the outer diameter of the inner tube 346 and the interior surface of the distribution hub defining the sides of the third step 332. When air is supplied to the air port 318, it is received by the air chamber and is subsequently exhausted from that chamber into the air duct 208 as indicated by air flow arrow 347.

Fourth 350 and fifth 352 steps in the distribution hub 120 define an "n" shaped liquid nutrient chamber 312 that receives liquid nutrients and air exhausted from the upper end of the inner tube 316. The nutrients are subsequently dispensed from that chamber through a plurality of fluidly connected dispensing ports 310. The dispensing ports are fluidly connected with respective distribution tubes 118 (see FIG. 2).

In the embodiment shown in FIGS. 1*a* and 1*b*, the distribution tubes 118 are inserted in respective dispensing ports 310. A seal between each tube and its respective dispensing port is formed by an interference fit or by another means similar to those mentioned above.

In another embodiment, the distribution tubes 118 are inserted through the dispensing ports 310 and protrude into the liquid nutrient chamber 312. Here, the liquid nutrients and air pass directly from the nutrient chamber into the distribution tubes.

The presence of the liquid nutrient chamber 312 enhances the flow of the liquid nutrient through the dispensing ports 310. Thus, it is an advantage of the invention that it provides enhanced uniformity of liquid nutrient distribution amongst the plants and/or planting pots.

In an embodiment, the distribution hub 120 is formed from a first hub part or cap 120*a* mated and removably sealed to a second hub part 120*b*. Typical seals in this application include those mentioned above and in particular elastomeric seals such as rubber "O" ring type seals. The interior of the liquid nutrient chamber 312 is exposed when the first and second hub parts are separated. This arrangement allows convenient access for cleaning the liquid nutrient chamber and the dispensing ports 310.

In another embodiment, a generally circular nose portion of the second hub part 356 is spaced a part from the interior surface of the distribution hub 120 defined by the fourth step 350 to create an annular liquid nutrient passage 358 that is in fluid communication with the dispensing ports 310. And in some embodiments, the nose portion of the second hub part includes a plurality of spaced apart radial ribs 360. The ribs are arranged to provide abutments for the distribution members 118 when they are inserted through respective dispensing ports. The spaces between adjacent ribs maintain fluid communication between the distribution tubes and the liquid nutrient chamber 312.

Figure 4A:
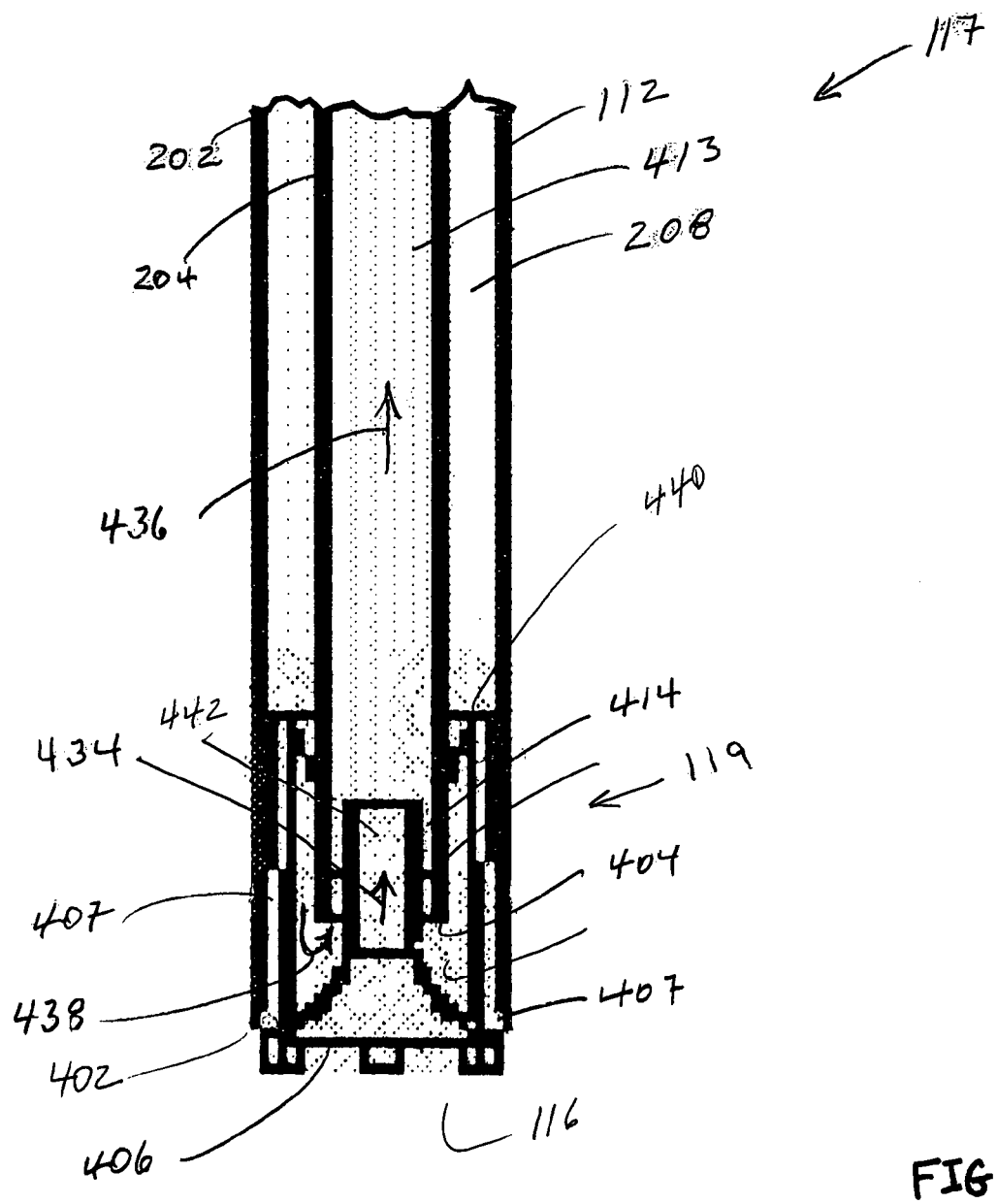

FIG. 4a shows an enlarged view of the liquid intake end of the pump body 117 and the liquid intake structure 119. The liquid structure includes the lower end of the outer tube 402, the lower end of the inner tube 404, and an inverted funnel insert 406.

Figure 4B:
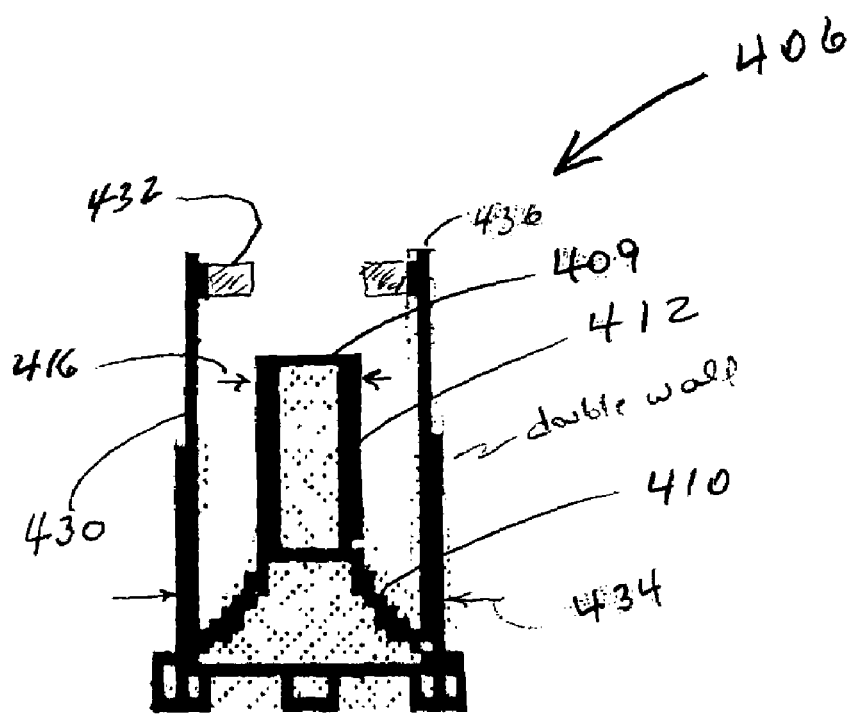

Referring also to FIG. 4b, a circular funnel shroud 430 is attached to the bell-mouth of the funnel insert 410. The funnel shroud extends in the direction of the funnel insert's tubular end 412. The outer diameter of the funnel shroud 434 is circumferentially sealed by a third fluid-tight seal 407 to the inside diameter of the outer tube 342. Typical sealing methods include those mentioned above.

In some embodiments, a centering collar 432 is formed near the upper end of the funnel shroud 436. The inner tube 204 passes through the centering collar which stabilizes its location relative to the outer tube 202.

The upper end of the funnel is a tubular section 412 having a central fluid passage 442 that is inserted in the lower end of the inner tube 404. The funnel intake is its downwardly facing bell-mouth 410 and the funnel exhaust is its upwardly facing tubular outlet 409 as indicated by liquid flow arrow 434.

The inside diameter of the inner tube 344 is larger than the outside diameter of the funnel's tubular section 416 such that an air passage with an annular cross-section 414 is formed between the inner tube's inside diameter and the funnel's tubular outside diameter.

During setup, the dispensing assembly 110 is positioned in the reservoir 102 so that the liquid nutrient level 122 is lower than the lower ends of the planting pots 126, but higher than the funnel insert's bell-mouth inlet 410. As a result, the liquid nutrient will fill the inner tube 204 up to a level equal to the level of the liquid nutrients in the reservoir.

Use of a reservoir 102 that is open to the atmosphere provides the present invention with additional advantages. First, the reservoir provides storage capacity for liquid nutrient and thereby avoids the need for an external water source and in particular for a pressurized external water source. Second, the addition and mixing of solid or liquid nutrients with liquid within the reservoir does not require nutrient introduction under pressure or that a pressurized seal be opened. And third, the proper proportion of liquid within the reservoir to nutrients being added can be precisely controlled using simple measurements including volume and/or weight measurements.

Operation occurs when the pressurized gas source 349 delivers a pressurized gas such as air via the air port 318 to the air chamber 326. References herein to air include air or another gas. Pressurized air collected in this chamber flows into the annular duct 208 as indicated by flow arrow 347 toward the funnel insert 406 at the intake end of the pump body 116. When the air nears the end of the inner tube 404, it is forced to pass through the air passage 414 between inside diameter of the inner tube 344 and the outside diameter of the funnel tube 416. The airflow into the air passage is indicated by flow arrow 438.

Since liquid nutrient 413 is contained inside the inner tube 204, air 438 entering the tube through the air passage 414 displaces and lifts a portion of the liquid nutrient within the inner tube until it reaches the liquid nutrient chamber 312 at the distribution end of the pump body 114. Flow arrow 436 indicates this flow of liquid nutrient and air.

Liquid nutrient received in the liquid nutrient chamber 312 subsequently flows into the distribution members 118 that are inserted in or fluidly connected with the distribution ports 310 via liquid passage 358. As liquid nutrient is pumped from the distribution end of the inner tube 316, the inner tube 204 is refilled by liquid nutrient being drawn from the reservoir 102 via the bell-shaped inlet mouth of the funnel 410. The pumping operation stops when the pressurized air source 349 ceases to deliver air to the air inlet port 318.

It is another advantage of the dispensing assembly 110 that it provides a simplified and energy efficient liquid pumping means that can be powered by a single pressurized air source such as a pneumatic pump or another source of pressurized gas such as a container of pressurized carbon dioxide or nitrogen gas.

When a pneumatic or another pump is used, it can be powered by standard household AC current or from a photovoltaic power source. If a photovoltaic power source is used, the photovoltaic power source's DC output may be directly connected to a DC air pump motor. Where an AC air pump motor is used, a DC to AC electric power converter may be used to interconnect the DC output of a photovoltaic or other DC electric power source to the AC input of the pump motor.

Figure 5A:
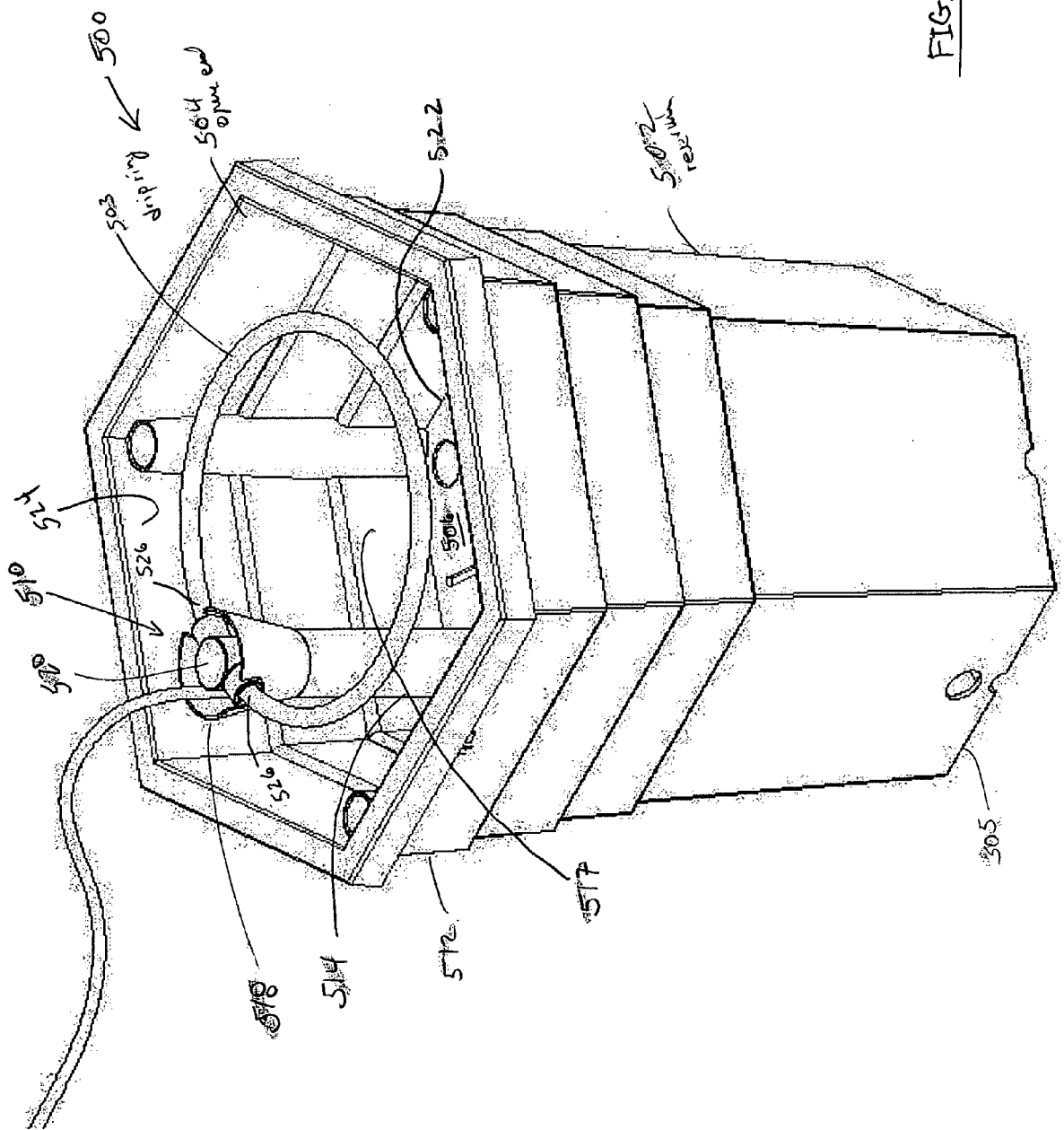
FIG. 5a is a cross-sectional view of a second exemplary embodiment of a reservoir and a pneumatic liquid nutrient dispenser of the present invention.
Figure 5B:
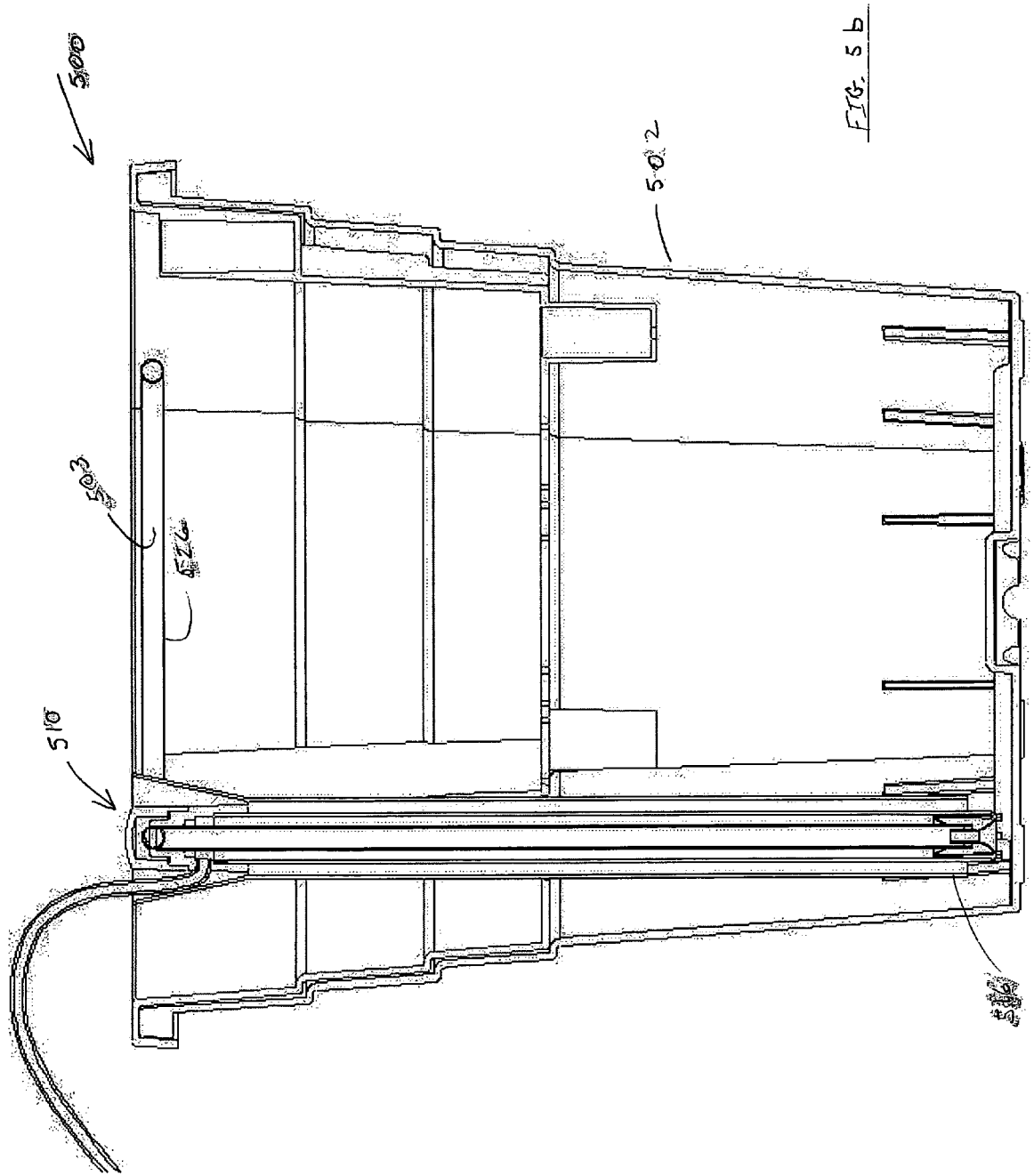

In an alternative embodiment, FIGS. 5a and 5b show a hydroponic cultivator 500 having a drip ring 503. The cultivator includes a reservoir 502 having an open upper end 504, a closed lower end 505, and an internal horizontal tray 506, and a vertically oriented pneumatic liquid nutrient dispensing assembly 510 located near a sidewall of the reservoir 512.

The drip ring 503 forms an open loop lying substantially in a plane. The ring has a tubular cross-section and drip holes in the ring 526 (see FIG. 5b) are located at appropriate points to provide for dispensing liquid nutrients for one or more plants being grown within the hydroponic cultivator. The drip ring can be made of any suitable material. Representative materials include thermoplastic resins and a preferred material is PVC.

The internal horizontal tray 506 is located between the reservoir's open upper end 504 and its lower closed end 505. The tray is supported by the inner sidewalls 522 of the reservoir 502. A containment for plant growing media 517 is bounded by the tray and the reservoir's inner sidewalls 524. In another embodiment, the tray supports one or more planting pots.

The pneumatic liquid nutrient dispensing assembly 510 is supported by a tubular shroud 514. The lower end of the tubular shroud 516 (see FIG. 5b) is supported from the lower end of the reservoir 505 and the upper end of the tubular shroud 518 surrounds a portion of the distribution hub at the upper end of the liquid nutrient dispensing assembly 520.

Figure 6:
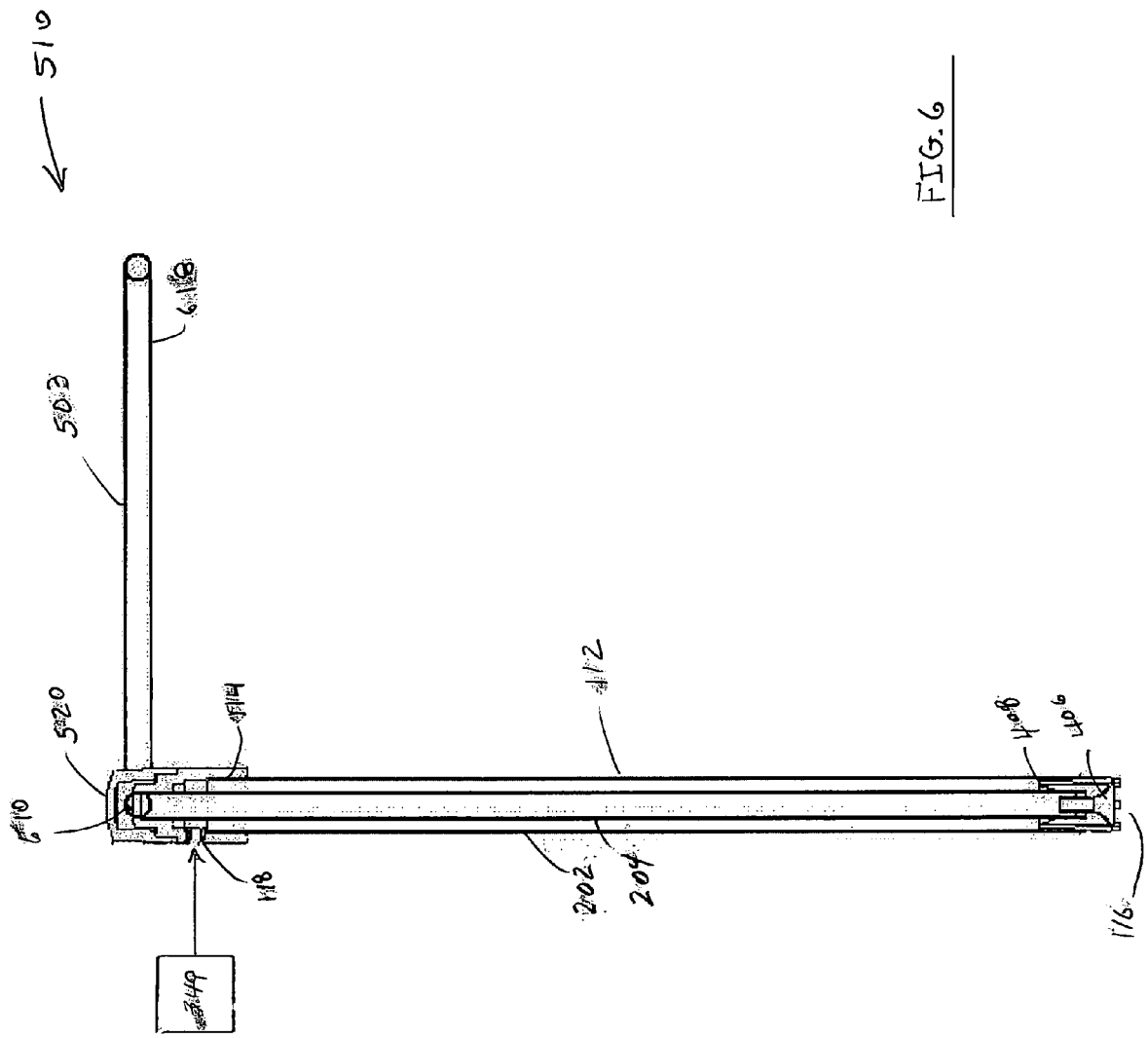
FIG. 6 is a cross-sectional view of the liquid nutrient dispenser of FIG. 5*a*.

FIG. 6 shows the pneumatic liquid dispensing assembly 510 removed from the tubular shroud 514. This dispensing assembly is similar to the one mentioned above. It includes a pump body 112 comprising outer 202 and inner 204 tubes with an upper distribution end 114 and a lower inlet end 116. The lower inlet end includes an intake structure 119 with an inverted funnel insert 406. The upper distribution end includes a distribution hub 510 and a drip ring 503.

As contrasted with the distribution hub mentioned above (see 120 of FIG. 1b), here the distribution hub has two typically opposed dispensing ports 610 supplying a single distribution member, the open loop drip ring 503. The ends of the open loop drip ring 526 are fluidly connected to respective dispensing ports.

Setup and operation of the drip ring embodiment of the present invention is similar to setup and operation of the radial distribution member embodiment of the present invention as they are described above.

What is claimed is:

1. An assembly for dispensing liquids comprising:
a hollow intake structure having a liquid entry end and a liquid exit end, said liquid entry end for immersion in a liquid;
a first tube having an inlet end and an outlet end wherein said inlet end surrounds a portion of the liquid exit end to form a first annular passage there between;
a gas chamber receiving gas from a gas source and supplying gas to the first annular passage;
a gas and liquid chamber formed within a distribution hub and receiving gas and liquid from the outlet end of the first tube;
wherein the distribution hub has a first opening in fluid communication with the gas and liquid chamber and a first seal between said first opening and the outlet end of the first tube; and,
wherein gas and liquid are supplied by the gas and liquid chamber to one or more distribution members; wherein the distribution hub has a second opening in fluid communication with the gas chamber and a second seal between said second opening and an inlet end of a second tube; wherein the first opening is substantially coaxial with the second opening and the gas chamber is formed between the wall of the first tube and the distribution hub; and wherein a third seal is formed between an outlet end of the second tube and the liquid entry end of the intake structure wherein gas supplied to the gas chamber flows through an annular duct formed between the first and second tubes and into the first tube via the first annular passage.

2. The assembly of claim 1 wherein gas entering the first tube carries liquid within the first tube to the gas and liquid chamber.

* * * * *